United States Patent Office 3,341,294
Patented Sept. 12, 1967

3,341,294
DIOXYGEN BROMINE PENTAFLUORIDE
Aristid V. Grosse and Alex G. Streng, Philadelphia, Pa., assignors, by mesne assignments, to the United States of America as represented by the Secretary of the Navy
No Drawing. Filed Jan. 10, 1964, Ser. No. 337,106
2 Claims. (Cl. 23—203)

ABSTRACT OF THE DISCLOSURE

The compound $O_2BrF_5$ is useful as an oxidizer, particularly in solid-propellant technology. It is prepared by depositing a coating of $O_2F_2$ on a surface maintained at 90° K., subsequently coating said $O_2F_2$ with a stoichiometric amount of $BrF_3$, and then raising the temperature from 90° K. to 130° K.

---

This invention relates to a new type of high energy oxidizer and particularly to dioxygen bromine pentafluoride and a process of making the same.

Solid-propellant technology, with few exceptions, is based on the oxidation of hydrogen and carbon atoms by a high energy oxidizer. An object of this invention is to provide a new chemical having a remarkable oxidizing power even at low temperatures. The invention further provides processes of making the same.

Other objects and many of the attendant advantages of this invention will be readily appreciated as the same become better understood by reference to the following detailed description.

A new type of high energy oxidizer, dioxygen bromine pentafluoride, having the formula $O_2BrF_5$ can be prepared by the addition of bromine trifluoride to dioxygen difluoride in line with the formula:

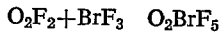

$$O_2F_2 + BrF_3 \rightarrow O_2BrF_5$$

if the reaction is carried out under extremely mild conditions as set forth below.

Example 1

1.0 gram of dioxygen difluoride was vacuum distilled into a Pyrex reaction flask of about 100 cc. volume. The deposit was then melted and distributed evenly on the walls of the lower half of the reaction flask by rotation and frozen at 90° K. At this point, bromine trifluoride was vacuum distilled into the reaction flask in portions of 100 mg. until 1.96 grams or a stoichiometric amount was added to the flask. As such, the bromine trifluoride was introduced into the flask as a vapor but soon formed a coating on the exposed surface of the dioxygen difluoride due to the fact that the flask was maintained at 90° K. After the bromine trifluoride was fully solidified, the reaction vessel was warmed slowly to 130° K. and a known violet compound, $O_2BrF_5$, was formed in a 80% yield. The reaction, to some extent, was accompanied by some gas evolution due to the decomposition of $O_2BrF_5$ to $BrF_5$ and $O_2$ and to partial decomposition of $O_2F_2$ to $O_2$ and $F_2$.

It is apparent from the foregoing description that we have invented a new type of high energy oxidizer, namely, $O_2BrF_5$, dioxygen bromine pentafluoride, which due to its activity may be used to oxidize such things as fuels.

Obviously, many modifications and variations of the present discovery will become apparent to one skilled in the art in view of the above teaching so that it is to be understood that this invention as set forth in the appended claims, may be practiced otherwise than as described.

We claim:
1. Dioxygen bromine pentafluoride, $O_2BrF_5$.
2. A process of producing dioxygen bromine pentafluoride comprising:
   depositing a coat of $O_2F_2$ on a surface maintained at a temperature of 90° K.,
   subsequently coating said $O_2F_2$ with a stoichiometric amount of $BrF_3$, and
   raising the temperature from 90° K. to 130° K.

References Cited
UNITED STATES PATENTS 3,035,893   5/1962   Roberts _____ 23—367

OTHER REFERENCES

Streng et al., "Advances In Chemistry Series, Number 36, Free Radicals in Inorganic Chemistry," 1962, pages 159–165.

MILTON WEISSMAN, *Primary Examiner.*